United States Patent [19]
Alperovich et al.

[11] Patent Number: 5,978,673
[45] Date of Patent: Nov. 2, 1999

[54] PROVIDING LOCATION-BASED CALL FORWARDING WITHIN A MOBILE TELECOMMUNICATIONS NETWORK

[75] Inventors: Vladimir Alperovich, Dallas; Eric Valentine, Plano, both of Tex.

[73] Assignee: Ericsson Inc., Research Triangle Park, N.C.

[21] Appl. No.: 08/766,296

[22] Filed: Dec. 13, 1996

[51] Int. Cl.$^6$ .................................................. H04Q 7/22
[52] U.S. Cl. ............................................. 455/417; 455/414
[58] Field of Search ................................... 455/417, 456, 455/445, 432, 414

[56] References Cited

U.S. PATENT DOCUMENTS

| | | | |
|---|---|---|---|
| 5,497,412 | 3/1996 | Lannen et al. | 455/432 |
| 5,504,804 | 4/1996 | Widmark et al. | 455/414 |
| 5,557,655 | 9/1996 | Lantto | 455/432 |
| 5,689,548 | 11/1997 | Maupin et al. | 455/404 |

Primary Examiner—Dwayne D. Bost
Assistant Examiner—Myron K. Wyche
Attorney, Agent, or Firm—Jenkens & Gilchrist

[57] ABSTRACT

Call forwarding data, including forward to numbers for a particular mobile station are correlated with a particular service area and stored at a home location register (HLR) associated with that particular mobile station. Whenever the mobile station travels into a mobile switching center (MSC) serving that particular service area, the MSC performs a location update with the HLR. A location update signal further includes data representing the identity of the service area currently serving the mobile station. Upon receiving the location update signal from the serving MSC, the HLR analyzes the received data to determine the identity of the service area currently serving the mobile station and retrieves the call forwarding data associated with that particular service area. The retrieved call forwarding data are then analyzed to determine whether the forward to numbers are located in the current service area for the mobile station and, if so, transmitted back to the serving MSC in order to provide location-based call forwarding to the roaming mobile station.

34 Claims, 6 Drawing Sheets

PROVIDING LOCATION-BASED CALL FORWARDING WITHIN A MOBILE TELECOMMUNICATIONS NETWORK

BACKGROUND OF THE INVENTION

1. Technical Field of the Invention

The present invention relates to a telecommunications network and, in particular, to the provision of location-based call forwarding within a Public Land Mobile Network (PLMN).

2. Description of Related Art

With the advent and development of mobile telecommunications systems, telecommunications users are no longer physically bound to wireline terminals or fixed locations for telecommunications network communications. Using the added capabilities of roaming and interoffice handoffs, mobile subscribers may travel between multiple Public Land Mobile Networks (PLMNs) utilizing the same telephone number and the same mobile station to originate outgoing calls and to receive incoming calls. Thus, a mobile subscriber may access telecommunications service from multiple locations utilizing multiple service providers with any incurred fees being charged to a single subscription.

Additionally, parties originating a call do not necessarily have to know where the desired mobile subscriber is physically located in order to properly route and to establish a call connection. Data signals between visitor location registers (VLRs) and a home location register (HLR) automatically update and store subscriber information enabling the network to reroute incoming calls to the appropriate mobile switching center (MSC) serving the roaming mobile subscriber. Furthermore, regardless of which MSC is currently serving the mobile station, the VLR associated with the serving MSC communicates with the HLR assigned to the mobile station to retrieve the requisite subscriber data, including subscriber feature data and billing data, and provide uniform mobile service to the mobile station.

However, such uniformity in service is not always desirable for a subscriber. For example, such uniformity in service to a roaming mobile station is not desirable where a caller desires not so much to contact a particular mobile subscriber, but to contact a mobile subscriber if that mobile subscriber is within a certain geographical location. For example, where the mobile subscriber is a service provider (e.g., maintenance provider for office equipment) and the caller desires to initiate a service call, it is only desirable to reach the mobile subscriber when that mobile subscriber is in the caller's general geographical location. It provides the caller with no benefit to have his or her call forwarded to a maintenance person when that person is traveling outside his or her normal geographical area. Additionally, it is desirable for such a service provider to have only a single or very few service numbers available to its customers.

A much more desirable system would allow a mobile telecommunication system to forward to one of a predetermined set group of mobile stations based upon the location of mobile subscriber called.

Accordingly, there is a need for a mechanism to enable the mobile telecommunications network to provide service area call forwarding features to mobile subscribers, enabling mobile subscribers to maximize desired use of the feature and minimized unproductive use of such features.

SUMMARY OF THE INVENTION

The present invention discloses a method and system for providing location-based call forwarding features to a mobile station. Using the present invention method and system, when a call enters the gateway mobile switching center (GMSC), the GMSC communicates with a home location register (HLR) associated with the mobile station to determine the MSC currently serving the mobile station. The HLR is periodically provided with a location update signal including data identifying the service area currently serving the mobile station. By analyzing the received data, the HLR is able to determine the identity of the service area currently serving the mobile station.

The service area determined and analyzed by the HLR includes a Public Land Mobile Network (PLMN) area currently covering the mobile station. The service area may also include an MSC coverage area currently covering the mobile station. Alternatively, the service area may also include a location area within a particular serving MSC coverage area. For the HLR to properly analyze and determine the location area, the location update signal transmitted by the serving MSC further includes data representing the location area currently serving the mobile station.

Once the general location of the mobile station is known, the HLR, finding the mobile station is busy, forwards the incoming call to one of a number of predetermined forward to numbers based upon location.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
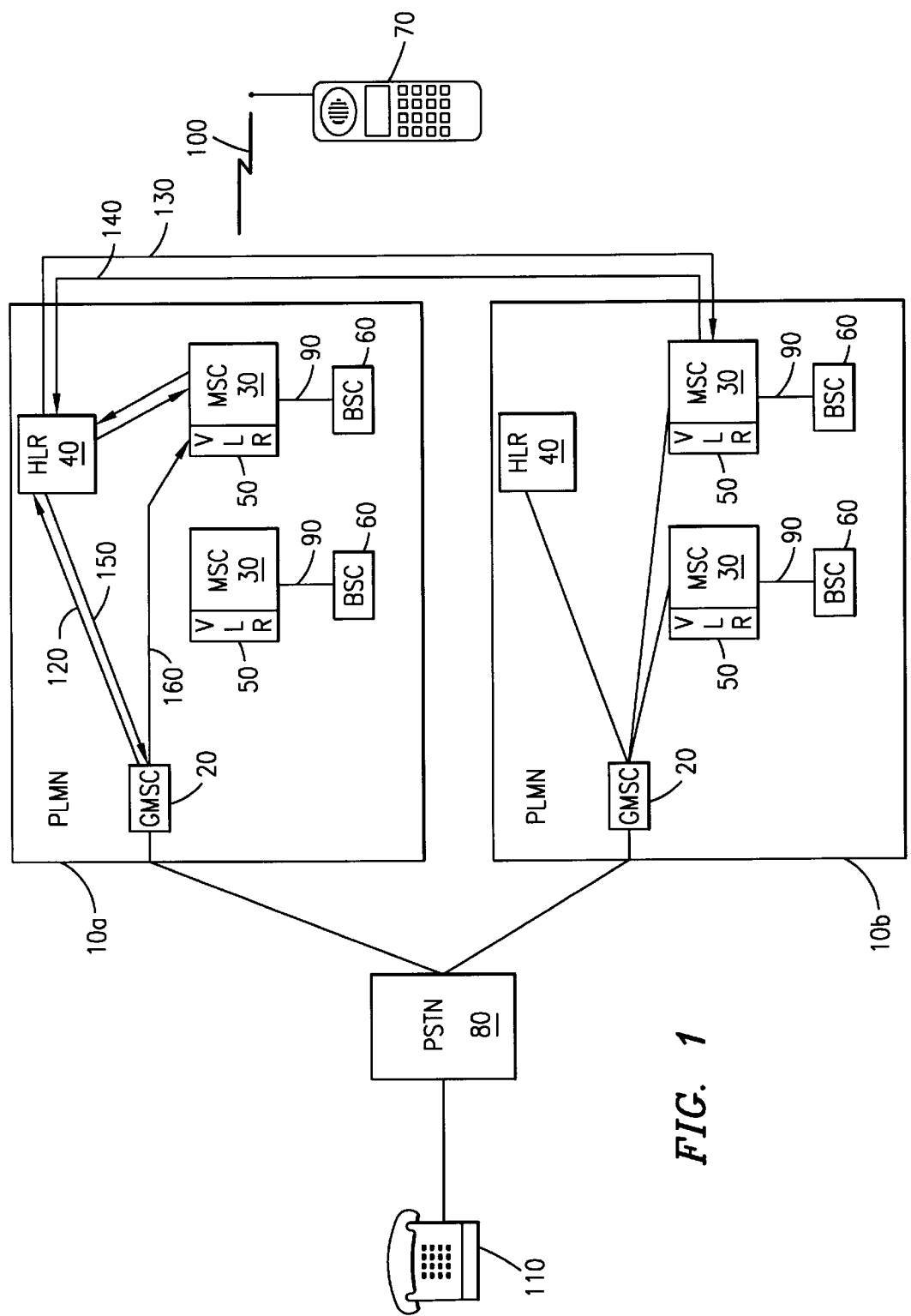
FIG. 1 is a block diagram illustrating a public land mobile network (PLMN) interfacing with a mobile station and a public switched telephone network (PSTN)

FIG. 1 shows a block diagram of a telecommunications system in which the present invention method and system may be implemented. A public land mobile network (PLMN) 10a or 10b comprises a gateway mobile switching center (GMSC) 20, at least one mobile switching center (MSC) 30, a home location register (HLR) 40, a visiting location register (VLR) 50 and a base station controller (BSC) 60 associated with each MSC 30. The PLMN 10a or 10b is used to communicate with a mobile station 70 and is also linked with a public switched telephone network (PSTN) 80 to provide communications with other telephone subscribers. The BSC 60 is linked with the MSC 30 using digital communications link 90 and communicates with the mobile station 70 via a radio channel 100. The HLR 40 comprises a database containing information about "home"

subscribers, their services and their locations. For purposes of this application, "home" is defined as the PLMN service provider with which the subscriber has their agreement. The VLR 50 comprises a database containing information about "visiting" subscribers, their services and their location. For purposes of this application, "visiting" is defined as the situation when a mobile station has traveled out of its home PLMN and is being serviced by a MSC other than their home MSC.

When the mobile station 60 travels out of its home PLMN 10*a* and into a visited PLMN 10*b*, a visited MSC 30 communicates with the HLR 40 within the home PLMN 10*a* to authenticate and verify telecommunications service for the visiting mobile station 70 and to retrieve pertinent subscriber information from the home HLR 40. Once authenticated, the mobile station 60 is registered as a "roaming" subscriber and is provided with telecommunications service.

A telecommunications terminal, such as a wireline terminal 110, originates an outgoing call directed towards the mobile station 70 by dialing a directory number, such as a Mobile Subscriber Integrated Service Digital Network (MSISDN) number, associated with that mobile station 70. A call setup signal is initially routed from the PSTN 80 to the GMSC 20 serving the home PLMN 10*a* for the mobile station 70. The home GMSC 20 queries the home HLR 40 in response to the call setup signal to determine the exact location of the mobile station 70. The home GMSC 20 accomplishes this by sending a signal requesting a routing instruction to the home HLR 40 via signal link 120. The home HLR 40 determines the identity of the MSC 30 currently serving the mobile station 70 and further transmits a signal requesting a roaming number to the serving MSC 30 via signal link 130. The serving MSC 30 verifies that the mobile station 70 is currently within its service area and returns the roaming number to the home HLR 40 via signal link 140. The home HLR 40, in turn, forwards the received roaming number to the GMSC 20. The GMSC 20, utilizing the new roaming number, reroutes the received call setup signal, such as an Initial Address Message (IAM), to the specified MSC 30 via signal link 160. The serving MSC 40 then pages the mobile station 70 over a page channel (PCH) and, upon receiving a response therefrom, establishes a speech connection with the mobile station 70 over a traffic channel (TCH).

Accordingly, for the mobile telecommunications network to properly provide mobile service towards a particular mobile station, certain information needs to be periodically updated. The HLR 40 associated with the mobile station 70 must be updated with the identity of the MSC 30 currently serving the mobile station 70. This information is later utilized by the GMSC 20 to reroute incoming calls to the appropriate serving MSC 30. The serving MSC 30 and its associated VLR 50 must also be updated with the requisite subscriber data to provide appropriate mobile service to the mobile station 70. Each time a call is originated from or terminated towards the mobile station 70, the serving MSC 30 cannot afford to initiate a communication with the HLR 40 associated with the mobile station 70 to exchange the necessary information. Accordingly, the serving MSC 30 and the attached VLR 50 need to be updated with the necessary subscriber data specific to the visiting mobile station 70 to properly service the mobile station 70. Such data include subscriber feature preferences, billing account information, etc.

Figure 2:
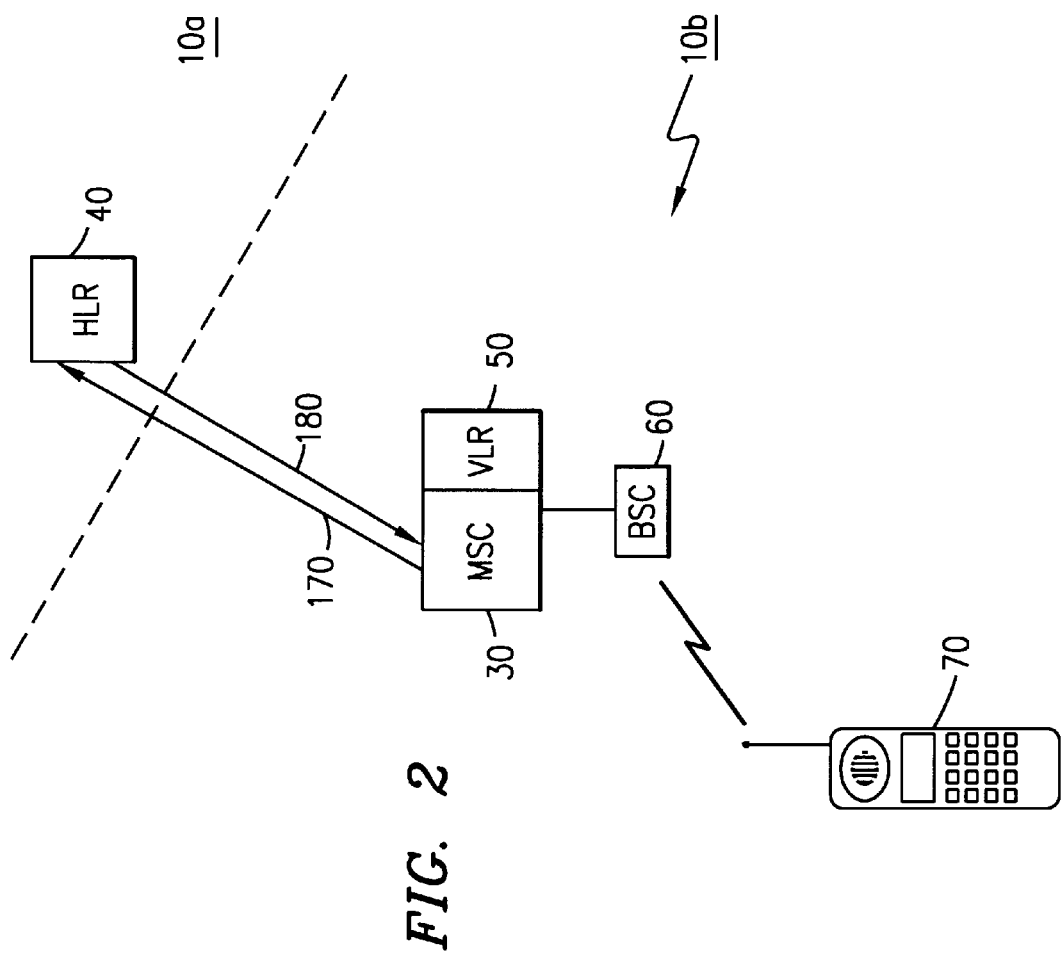
FIG. 2 is a block diagram illustrating a serving MSC performing a location update with a home location register (HLR)

In order for the mobile network to properly locate the called mobile station 70 and to reroute the incoming call to the appropriate MSC 30, the home HLR 40 needs to keep track of the current location of the mobile station 70. Accordingly, reference is now made to FIG. 2 illustrating a serving MSC 30 performing a conventional location update with the HLR 40 associated with the mobile station 70. Whenever the mobile station 70 roams into one of the location areas being served by the MSC 30, the mobile station 70 attempts to register with the serving MSC 30 by transmitting an identification number, such as an International Mobile Subscriber Identity (IMSI) number, associated with the mobile station 70 to the serving MSC 30 via the BSC 60.

In order to authenticate the mobile station 70, the serving MSC 30 utilizes the received IMSI number to transmit a location update signal (signal 170) to the HLR 40 associated with the roaming mobile station 70. By transmitting a Signaling Connection Control Point (SCCP) based Signaling System No. 7 (SS7) signal using the received IMSI number as the SCCP destination address enables the connecting telecommunications network to route the transmitted signal from the serving MSC 30 to the HLR 40. The HLR 40 associated with the roaming mobile station 70 then verifies the identity of the mobile station 70 and also updates its database to take note of the MSC currently serving the mobile station 70. Such information is later utilized by the HLR 40 to reroute incoming calls. The HLR 40 further retrieves subscriber data associated with the mobile station 70 and communicates the retrieved data to the serving MSC performing the location update (signal 180). The transmitted data are then utilized by the serving MSC 30 to provide mobile service to the roaming mobile station 70. Such subscriber data includes forward-to-numbers for call forwarding features, billing data, long distance carrier data, etc.

Upon receiving the transmitted subscriber data, the serving MSC 30 stores the data at the attached VLR 50. Thereinafter, mobile service in accordance with the received subscriber data is provided to the roaming mobile station 70. By requiring the serving MSC 30 to retrieve subscriber data from the HLR 40 specifically associated with the mobile station 70, regardless of which MSC is serving the mobile station 70, the same subscriber feature data, billing subscription, and other user defined information are utilized to provide uniform mobile service to the mobile station 70.

Figure 3:
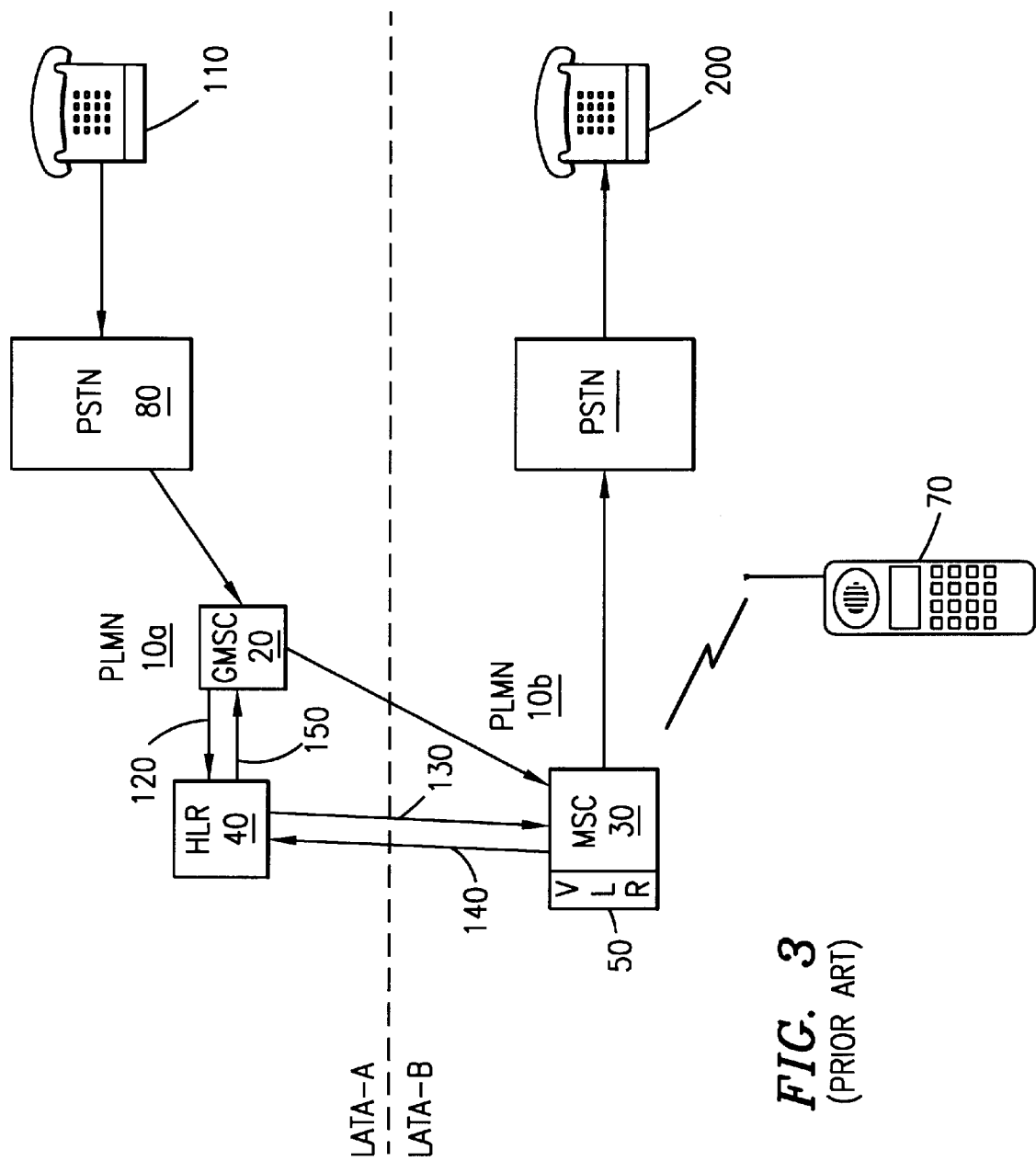
FIG. 3 is a block diagram illustrating the forwarding of an incoming call by a serving MSC to a designated forward-to-number in a conventional system.

However, as previously discussed herein, such uniformity in service is not always desirable. Reference is made again to FIGS. 2 and 3 to illustrate the forwarding of an incoming call by a conventional system. Upon performing a location update with the home HLR 40, the serving VLR 50 is updated with the requisite subscriber data including the forward-to-number for the prior art Call Forward on Busy (CFB) subscriber feature. Subsequently, another telecommunications terminal, such as the wireline terminal 110, dials the MSISDN number associated with the mobile station 70 and originates a call connection. A generated call setup message, such as an IAM signal, is first received by the serving GMSC 20 associated with the home PLMN 10*a* for the mobile station 70. The GMSC 20 then transmits a signal requesting routing instruction to the HLR 40 associated with the received MSISDN number (signal 120). The HLR 40, by retrieving the network address of the serving MSC 30 received during the last location update, also sends a signal requesting a roaming number to the serving MSC 30 (signal 130). The serving MSC 30 returns a roaming number to the HLR 40 (signal 140) and the HLR 40, in turn, forwards the received roaming number back to the GMSC 20 (signal 150). Utilizing the received roaming number, the incoming call is properly rerouted to the serving MSC 30. The serving MSC 30 next determines that the mobile station 70 is already in speech connection with another terminal and ascertains whether the mobile station 70 has one of the call forwarding features activated. Upon determining that the mobile station 70 has CFB activated, the serving MSC 30 retrieves the previously stored forward-to-number from the VLR 50 and accordingly forwards the received incoming call to the specified forward to number. As an illustration, a call connection between the wireline terminal 110 and a first telecommunications terminal 200 is accordingly established.

Such a call connection is inefficient and wasteful if the first telecommunications terminal 200 is located outside LATA (LATA-A) from where the call was intended. As previously discussed, in the example of a service call request it is of little or no use that the call was forwarded to a terminal or mobile station outside the appropriate geographical location since service is needed within that geographical area. As a result, the mobile subscriber has to pay for the long distance charges incurred for rerouting the call connection back to the first telecommunications terminal 200 and still has not had the information delivered to appropriate geographical area. In all likelihood, the first telecommunications terminal 200 will now have to generate a call (and probably incur long distance charges) back to the originating geographical area to get the service request filled.

It would therefore be advantageous for the mobile subscriber to have the ability to have calls directed to a mobile station target forwarded to one of a predetermined set of forward to numbers within the PLMN of the called mobile station so that when the mobile station 70 is busy or otherwise not receiving calls, the calls are routed to a number on the forward to list. By forwarding an incoming call to a mobile station to another telecommunications terminal within the targeted PLMN when the called mobile station is busy, no long distance charges are incurred by the mobile station 70 and the calls are received by a mobile station associated with the targeted PLMN, the area in which action is desired.

Accordingly, there is a need for a mechanism to enable the mobile telecommunications network to selectively forward a call to a predetermined list of numbers within a PLMN based upon the location of the mobile station.

Figure 4:
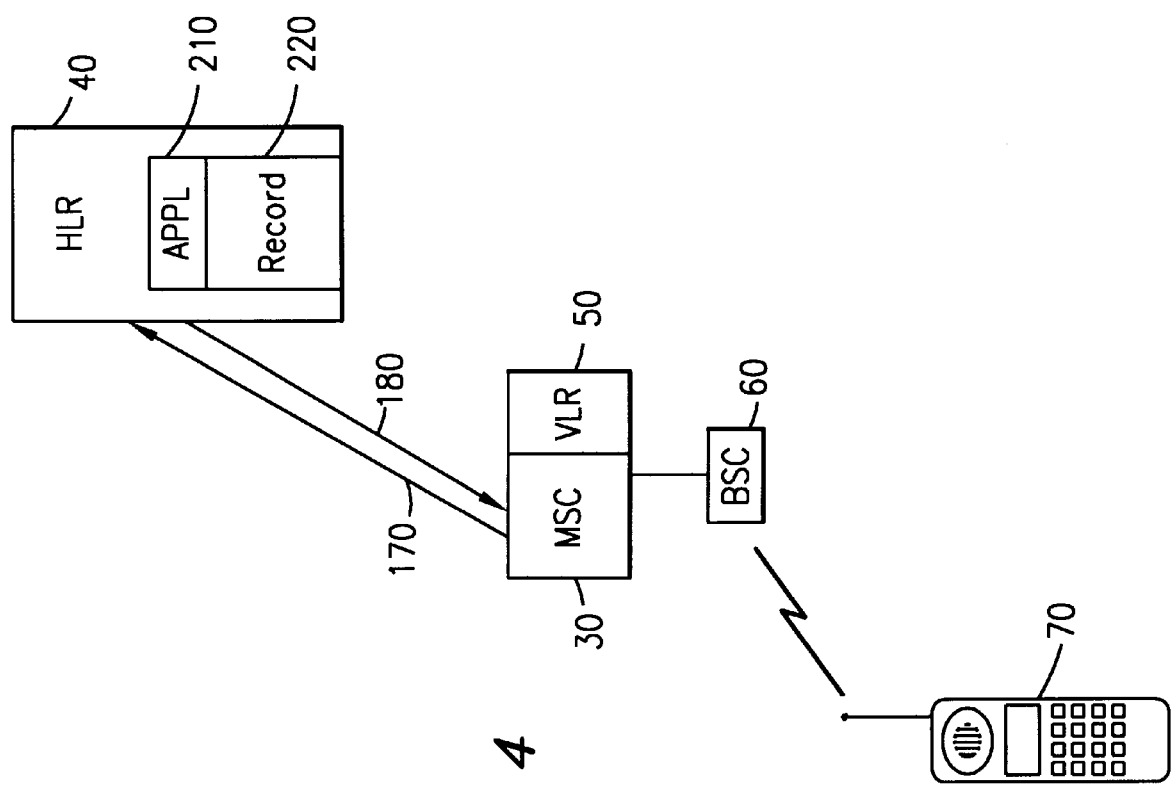
FIG. 4 is a block diagram illustrating the HLR associated with a particular mobile station providing location-based call forward data to a visited MSC.

FIG. 4 is a block diagram illustrating the HLR 40 associated with the mobile station 70 providing location based call forwarding. Whenever the mobile station 70 is turned on or travels into a new location area, the mobile station 70 performs a location update procedure with the serving MSC 30. The serving MSC 30, in turn, transmits a location update signal to the HLR 40 associated with the registering mobile station 70 (signal 170). While transmitting the location update signal, the serving MSC 30 further includes data representing the service area currently serving the mobile station 70. In case the mobile network wishes to provide PLMN or MSC service area dependent subscriber data, a network address representing the serving MSC 30 is transmitted to the HLR 40. By analyzing the network address, for example, representing the serving MSC 30, the HLR 40 is able to determine the identity of the PLMN or MSC coverage area serving the mobile station. In case the mobile network wishes to provide the location-based call forwarding feature of the present invention, the location update signal further needs to include data representing the serving location area, such as a location area identity (LAI).

Upon receiving the location update signal from the serving MSC 30, an application module 210 associated with the HLR 40 analyzes the data representing the service area currently serving the mobile station and accordingly retrieves the predetermined forward to numbers associated with that service area from the data register 220. As described above, in case the analyzed service area is not included as one of the pre-stored service areas within the data register 220, the master service area data are instead retrieved.

Using a signal, such as a Mobile Application Part (MAP) based Insert_Subscriber_Data signal, the HLR 40 communicates the retrieved data to the serving MSC 30 (signal 180). The serving MSC 30 then stores the received call forward data to the attached VLR 50. Thereinafter, the stored subscriber data are utilized by the serving MSC 30 to provide mobile service to the mobile station 70. As an illustration, one or more predetermined forward-to-numbers for CFB representing a local terminal within the serving service area are retrieved by the HLR 40 and communicated back to the MSC 30 and VLR 50. Subsequently, all incoming calls received by the serving MSC 30 while the mobile station 70 is busy are forwarded by the serving MSC 30 to one of the predetermined forward-to-numbers so that the call is completed with a mobile station or terminal within the desired geographical location.

In case the mobile station 70 roams into a different service area, another set of predetermined forward to numbers is again retrieved for this new service area and accordingly provided to the new MSC.

Figure 5:
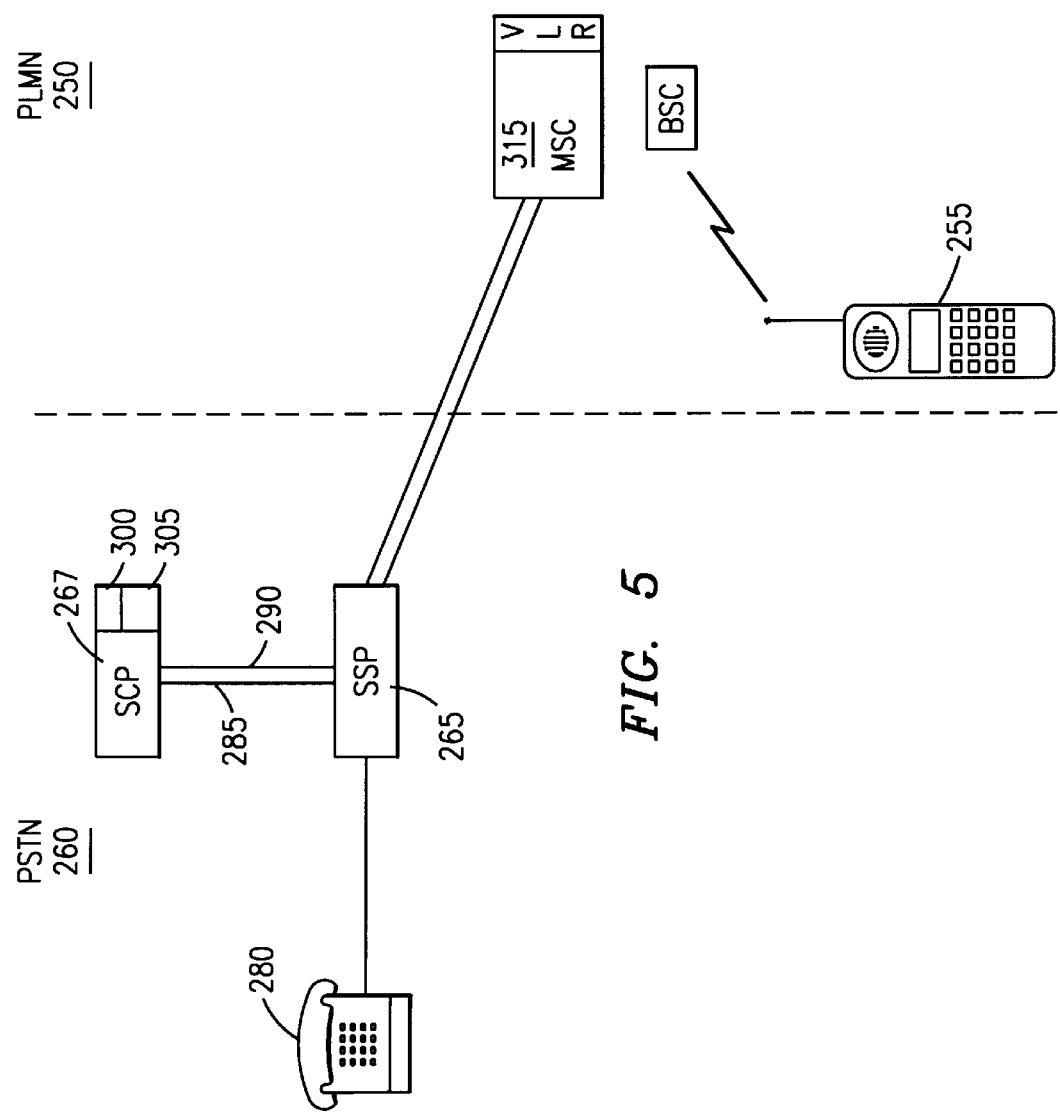
FIG. 5 is a block diagram illustrating a SLP providing location-based call forward data to a visited MSC.

Referring now to FIG. 5, there is shown an alternate embodiment of the location-based call forwarding feature of the present invention. More specifically, FIG. 5 illustrates an embodiment of the present invention implemented within an intelligent network (IN) or an advanced intelligent network (AIN). The PLMN 250 is used to communicate with mobile station 255 and is also linked with a public switched telephone network (PSTN) 260 to provide communications with other telephone subscribers 280. Within the PSTN 260, service switching point (SSP) 265 is connected to service control point (SCP) 267 via lines 285 and 290. In this embodiment of the location-based call forwarding feature of the present invention, the SCP 267 includes an application module 300 including a data register 305 having the predetermined list of forward to numbers for the mobile station 310. It is understood that line 285 and line 290 may actually represent a plurality of lines with an IN or AIN.

In use, if mobile station 255 is determined to be busy or unreachable, the serving MSC 315 informs SSP 265 of this state along with the location of the mobile station 255. The SSP 265 in turn informs the SCP 267 of this information. The SCP 267, utilizing the application module 300 and data register 305, determines the appropriate forward to number (e.g., based upon the location of the mobile station 255) and informs the SSP 265 to reroute the call to the appropriate forward to number. Alternately, the MSC 315 could attempt to complete the call setup without first querying the SSP 265. Again, if the mobile station 255 is busy or otherwise unreachable, the MSC 315 would then inform the SSP 265 of the unreachable state and the location of the mobile station 255. The SSP 265 would, in turn, inform the SCP 267 of this information and the SCP 267 would determine the appropriate forward to number based upon the location of the mobile station 255 and provide the SSP 265 with this information so that the call could be appropriately rerouted. In the PLMN context, a Mobile Application Part (MAP) based Insert_Subscriber_Data signal is used to communicate information between the HLR and the MSC. In the PSTN context, a Transaction Capability Application Part (TCAP) signal or Intelligent Network Application Part (INAP) signal is used to communicate information between the SSP 265 and the SCP 267.

Figure 6:
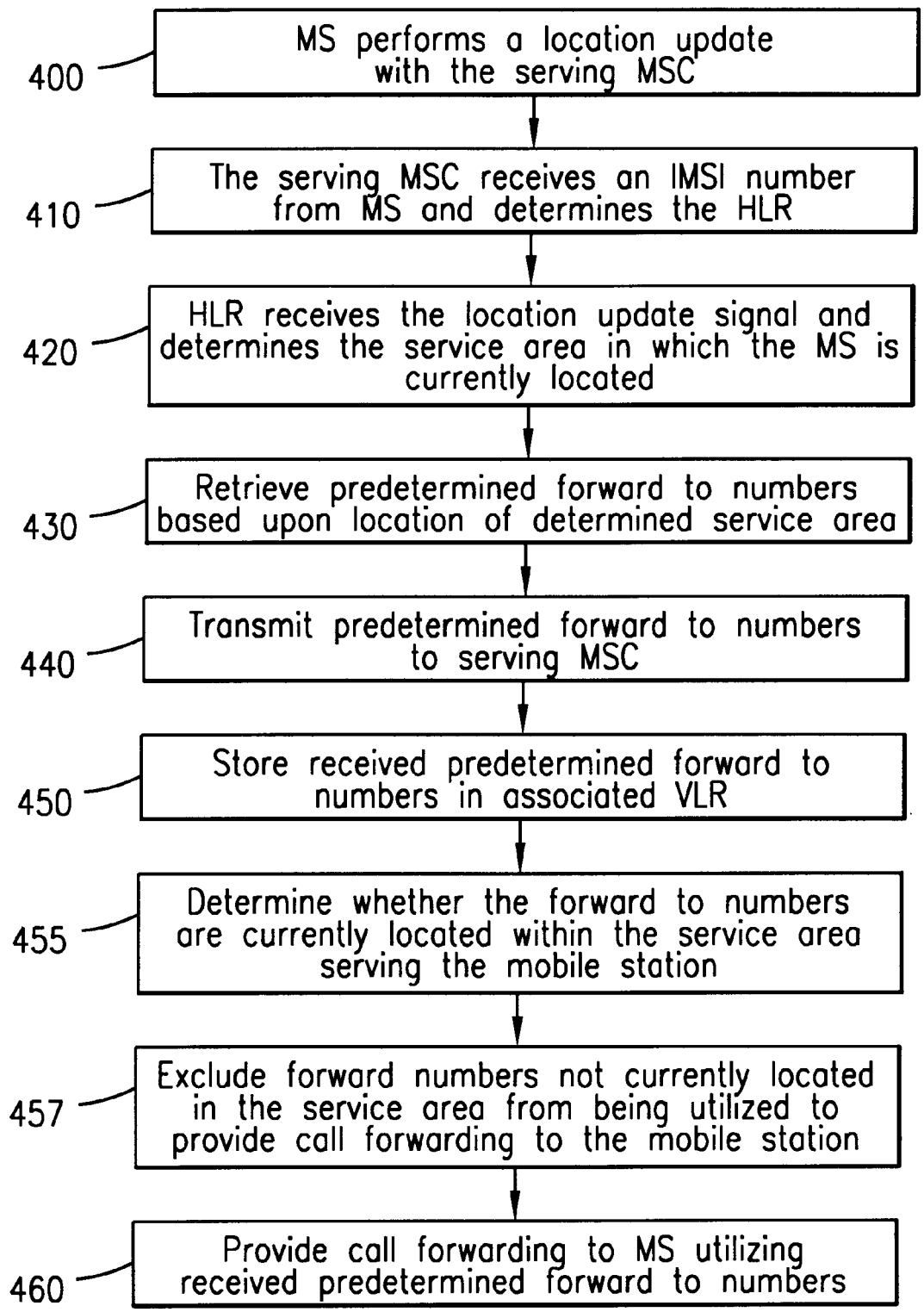
FIG. 6 is a flowchart illustrating the exemplary steps performed within a mobile telecommunications network for providing the location-based call forward feature of the present invention.

FIG. 6 is a flowchart illustrating the exemplary steps performed within a mobile telecommunications network for providing the location-based call forwarding feature of the present invention. As described above, whenever a mobile station travels into a new location area, the mobile station performs a location update with the serving MSC at step 400 and transmits its International Mobile Subscriber Identity (IMSI) number. By analyzing the received IMSI number, the serving MSC determines the identity of the HLR associated with the registering mobile station at step 410. The serving MSC, in turn, performs a location update with the HLR associated with the mobile station to inform the HLR of the mobile station's new location and to retrieve the requisite subscriber data at step 420. The serving MSC further transmits data representing the service area currently serving the mobile station. If the service area includes the serving PLMN or MSC coverage area, the network address presenting the serving MSC suffices. If the service area includes the location area currently serving the mobile station, the address, such as a location area identity (LAI) or cell identity, needs to be transmitted to the HLR.

As a result, the HLR receives the location update signal from the serving MSC and determines the service area currently serving the roaming mobile station at step 420. Utilizing the determined service area, the HLR retrieves the subscriber data, including the location-based call forwarding data, correlated with the current service area for the roaming mobile station at step 430. Using a MAP based Insert__ Subscriber__Data signal, the HLR transmits the retrieved subscriber data, including the set of call forwarding data, to the serving MSC at step 440. Included in the call forwarding data received is a set of predetermined forward to numbers previously selected by the mobile subscriber. Upon receiving the location-based forward to numbers from the HLR, the serving MSC stores the data at the attached VLR at step 450. Thereinafter, utilizing the service area dependent subscriber data, including the predetermined forward to numbers, provided by the HLR, the serving MSC provides mobile service to the roaming mobile station at step 460.

In another embodiment, the method further includes two steps which occur after step 450 and before step 460. The additional steps are: the step of determining whether the forward to numbers are currently located within the current service area for the mobile station (step 455); and, the step of excluding those forward to numbers not currently located within the service area serving the mobile station from being utilized to provide call forwarding service to the mobile station (step 457).

In yet another embodiment, in step 457 forward to numbers can be excluded based upon factors other than current location. For example, a time-based system could be employed to only use forward to numbers during certain time periods (e.g., weekends, between 9 a.m. and 5 p.m.). Forward to numbers could be subject to any number of criteria before being utilized in step 460 to provide the mobile station with call forwarding.

Finally, in another embodiment, steps 430 through 460 are slightly modified in that the application module including the data register of the predetermined forward to numbers is associated with a SCP versus a HLR. A SSP within an IN or AIN is contacted by the serving MSC and, in conjunction with the SCP, the SSP reroutes calls according to the predetermined forward to numbers.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for providing location-based call forwarding data to a mobile switching center (MSC) serving a mobile station within a mobile telecommunications network, said method comprising the steps of:

receiving a signal at a home location register (HLR) indicating that said mobile station is currently within a service area associated with said MSC;

retrieving a predetermined set of call forwarding data designated for use within the service area within which the mobile station is currently located; and providing said retrieved predetermined set of call forwarding data from said HLR to said MSC for call forwarding use when said mobile station is located within said service area.

2. The method of claim 1 wherein said step of receiving said signal at said HLR further includes the step of receiving a Mobile Application Part (MAP) based location update signal from said MSC, said location update signal further including a network address representing said MSC.

3. The method of claim 2 further comprising the step of analyzing said network address representing said MSC to determine said location of said service area.

4. The method of claim 1 wherein said service area comprises a Public Land Mobile Network (PLMN) area.

5. The method of claim 1 wherein said service area comprises a MSC coverage area.

6. The method of claim 1 wherein said signal received by said HLR further includes data identifying a location area where said mobile station is currently located, and said service area comprises said location area currently serving said mobile station.

7. The method of claim 1, wherein said retrieved predetermined set of call forwarding data comprises a selected one of a plurality of sets of forward-to-numbers and said step of poroviding further includes the step of determining which set of forward-to-numbers should be utilized for said service area.

8. The method of claim 7, wherein said step of providing further includes the step of determining whether any of said determined set of forward-to-numbers are currently located within said service area.

9. The method of claim 8, wherein said step of providing further includes the step of excluding, from said determined set, forward-to-numbers determined to not currently be located within said service area.

10. A method for retrieving location-based call forwarding subscriber data associated with a particular mobile station from a home location register (HLR) associated with said mobile station within a mobile telecommunications network, said method comprising the steps of:

detecting the presence of a particular mobile station by a mobile switching center (MSC) serving a particular service area;

transmitting a signal to a home location register (HLR) associated with said mobile station to update said HLR with a current location of said mobile station;

determining the identity of said service area providing mobile service to said mobile station;

retrieving a set of predetermined call forwarding data associated with said mobile station and designated for use by the mobile station within said determined service area; and transporting said retrieved predetermined call forwarding data from said HLR to said MSC serving said service area.

11. The method of claim 10, wherein said service area served by said MSC further includes a Public Land Mobile Network (PLMN) area.

12. The method of claim 11, wherein said service area served by said MSC further includes a MSC coverage area.

13. The method of claim 11, wherein said service area served by said MSC further includes a location area.

14. The method of claim 13, wherein said signal transmitted to said HLR further includes data identifying said location area.

15. The method of claim 10, wherein said retrieved predetermined set of call forwarding data includes forward-to-numbers associated with said current location.

16. The method of claim 15, wherein said forward-to-numbers include one or more mobile station numbers and said method further includes the step of determining whether said forward-to-numbers associated with said current location are currently located in said service area.

17. The method of claim 16, wherein any of said forward-to-numbers determined to be outside said service area are excluded from said set of predetermined call forwarding data.

18. A system for providing location-based call forwarding data to a mobile station within a mobile telecommunications network, said system comprising:

a MSC; and a HLR having a storage record, said HLR configured to:
receive a signal identifying a mobile switching center (MSC) currently serving said mobile station and the current location of said mobile station; and
retreive a predetermined set of call forwarding data from said storage record associated with said mobile station for said current location.

19. The system of claim 18, wherein said signal further comprises a Mobile Application Part (MAP) based location update signal, said location update signal further including a network address representing said MSC.

20. The system of claim 19, wherein said HLR is further configured to:
analyze said network address representing said MSC to determine a service area associated with said current location.

21. The system of claim 20, wherein said service area further includes a Public Land Mobile Network (PLMN) area.

22. The system of claim 20, wherein said service area further includes a MSC coverage area.

23. The system of claim 18, wherein said signal received by said HLR further includes data identifying a location area associated with said current location of said mobile station and wherein said service area further includes said location area currently serving said mobile station.

24. The system of claim 18, wherein said retrieved call forwarding data include forward-to-numbers.

25. The system of claim 24, wherein said forward-to-numbers further include one or more mobile station numbers and said HLR is further configured to:
determine whether said forward-to-numbers are currently located within said service area; and
provide said forward-to-numbers to said MSC if said forward-to-numbers are determined to be located within said service area.

26. The system of claim 25, wherein any of said forward-to-numbers not currently located within said service area are not provided to said MSC.

27. A method for providing location-based call forwarding to a mobile subscriber, comprising the steps of:

storing by a mobile subscriber at a HLR call forwarding data for said mobile subscriber for each one of a plurality of service areas;

determining;

if a current service area associated with said mobile subscriber matches one of said plurality of service areas; and providing call forwarding service to said mobile subscriber in accordance with said call forwarding data associated with said current service area if said current service area matches one of said plurality of service areas.

28. The method of claim 27, wherein said step of determining further comprises the step of receiving a signal from a mobile switching center (MSC) serving said mobile subscriber, said signal including data identifying said current service area.

29. The method of claim 27, wherein said call forwarding data further includes forward-to-number, said forward-to-numbers including one or more mobile station numbers and wherein said method further includes the steps of: determining whether said forward-to-numbers are currently located within said service area; and providing said forward-to-numbers to said MSC.

30. The method of claim 29, further including the step of excluding forward-to-numbers not currently located with in said service area from being provided to said MSC.

31. A method for providing location-based call forwarding data to a mobile switching center (MSC) serving a mobile station (MS) in a mobile telecommunications network, said method comprising the steps of:

receiving a signal at a Home Location Register (HLR) indicating that said MS is currently within a service area associated with said MSC; and providing a predetermined set of call forwarding data from said HLR to said MSC based on the location of said service area wherein the predetermined set of call forwarding data is designated for use within said service area.

32. The method of claim 31, wherein said predetermined set of call forwarding data includes one or more sets of forward-to-numbers and said step of providing further includes the step of determining which set of forward-to-numbers to provide based on said location.

33. The method of claim 32, wherein said step of providing further includes the step of determining which forward-to-numbers in said determined set are currently located within said service area.

34. The method of claim 33, wherein said step of providing further includes the step of:

determining which forward-to-numbers in said determined set are not currently located in said service area; and excluding from said determined set said determined forward-to-numbers not currently located within said service area.

* * * * *

UNITED STATES PATENT AND TRADEMARK OFFICE
CERTIFICATE OF CORRECTION

PATENT NO.    : 5,978,673
DATED         : November 2, 1999
INVENTOR(S)   : Alperovich et al.

It is certified that error appears in the above-identified patent and that said Letters Patent is hereby corrected as shown below:

<u>Column 8,</u>
Line 42, replace "poroviding" with -- providing --

<u>Column 10,</u>
Line 9, replace ";", move line 10 up to line 9

Signed and Sealed this

Twelfth Day of March, 2002

Attest:

JAMES E. ROGAN
*Attesting Officer*    *Director of the United States Patent and Trademark Office*